United States Patent
Wang et al.

(10) Patent No.: US 12,335,518 B1
(45) Date of Patent: Jun. 17, 2025

(54) OPTIMIZING VIDEO DATA UPLOAD FOR DASHCAM EVENT REVIEWS

(71) Applicant: Samsara Inc., San Francisco, CA (US)

(72) Inventors: Jing Wang, Toronto (CA); Narendran Rajan, San Diego, CA (US); William Nathan John Hurst, Seattle, WA (US); William Evan Welbourne, Seattle, WA (US); Greg Allen Cummings, San Francisco, CA (US); Siddharth Heroor, Peoria, AZ (US)

(73) Assignee: Samsara Inc., San Francisco, CA (US)

( * ) Notice: Subject to any disclaimer, the term of this patent is extended or adjusted under 35 U.S.C. 154(b) by 164 days.

(21) Appl. No.: 18/064,224

(22) Filed: Dec. 9, 2022

(51) Int. Cl.
  *H04N 19/59* (2014.01)
  *G06V 20/40* (2022.01)
  *H04N 19/167* (2014.01)

(52) U.S. Cl.
  CPC ............ *H04N 19/59* (2014.11); *G06V 20/44* (2022.01); *H04N 19/167* (2014.11)

(58) Field of Classification Search
  CPC ....... H04N 19/59; H04N 19/167; G06V 20/44
  USPC ....................................... 375/24.21
  See application file for complete search history.

(56) References Cited

U.S. PATENT DOCUMENTS

| | | | |
|---|---|---|---|
| 10,225,607 B1* | 3/2019 | Bai | G06N 3/045 |
| 2016/0189749 A1* | 6/2016 | Rav-Acha | A61B 5/1128 |
| | | | 386/278 |
| 2020/0312063 A1* | 10/2020 | Balakrishnan | B60Q 9/00 |

(Continued)

OTHER PUBLICATIONS

BlackVue Dash Cameras, "Live Event Upload: The Best Reason to Use BlackVue Cloud", Available Online at <https://blackvue.com/live-event-upload-the-best-reason-to-use-blackvue-cloud/>, Jul. 9, 2021, pp. 1-6.

(Continued)

*Primary Examiner* — Jamie J Atala
*Assistant Examiner* — Mahmoud Kamal Abouzahra
(74) *Attorney, Agent, or Firm* — Nicholson, De Vos, Webster & Elliott, LLP

(57) ABSTRACT

Methods, systems, and apparatuses capture event video segments from an IoT device such as a dashcam in a vehicle. When an even is detected, the original resolution video segment is converted to a low resolution video segment and stored in a cloud backend. Some embodiments thus save bandwidth and storage space by transmitting low resolution video segment to the cloud backend and further save bandwidth and storage space by only storing video in the cloud backend when an event is detected. Bandwidth is also saved because, in some embodiments, original resolution video segments are stored on the IoT device and only transmitted to a reviewer when requested. In the cloud backend, the low resolution video segment is converted to a higher resolution video using a deep learning video upscaler before it is reviewed by a reviewer. A human reviewer can also review the original resolution video segment that is stored on the IoT device if it is desired to see the video segment in its original resolution. In some embodiments, a reviewer can request that an area of interest in the video segment being reviewed is upscaled. In such embodiments the entire low resolution video segment is not always upscaled in its entirety before review.

20 Claims, 9 Drawing Sheets

(56) References Cited

U.S. PATENT DOCUMENTS

2023/0281755 A1* 9/2023 Yang .................. G06N 3/08
                                                          382/100

OTHER PUBLICATIONS

Farooq et al., "Effectiveness of State-of-the-Art Super Resolution Algorithms in Surveillance Environment", Springer, Part of the Advances in Intelligent Systems and Computing book series, AISC, vol. 1376, 2021, pp. 1-10.
Hazra et al., "Upsampling Real-Time, Low-Resolution CCTV Videos Using Generative Adversarial Networks", Electronics 2020, vol. 9, No. 1312, Aug. 2020, pp. 1-20.
Lee et al., "Deep Neural Network-based Enhancement for Image and Video Streaming Systems: A Survey and Future Directions", ACM Comput. Surv., vol. 1, No. 1, Article 1, Jan. 2021, p. 1:1-1:31.
Nogueira et al., "Video Super Resolution Techniques: A Survey", International Journal of Engineering Research & Technology (IJERT), vol. 10, Issue 07, Jul. 2021, pp. 57-62.
Seshaiah et al., "CCTV Surveillance Camera's Image Resolution Enhancement using SRGAN", International Research Journal of Engineering and Technology (IRJET), vol. 7, Issue 6, Jun. 2020, pp. 1512-1519.
Sharma, Bhavuk, "Image and Video Upscaling and Downscaling using FPGA", InnovateFPGA, terasic.com, Apr. 2, 2022, pp. 1-5.
Thomas, Prasanth Aby, "Why Video Analytics Don't Care About High-Resolution Cameras", Available Online at <https://www.asmag.com/showpost/32350.aspx>, May 24, 2021, pp. 1-5.

* cited by examiner

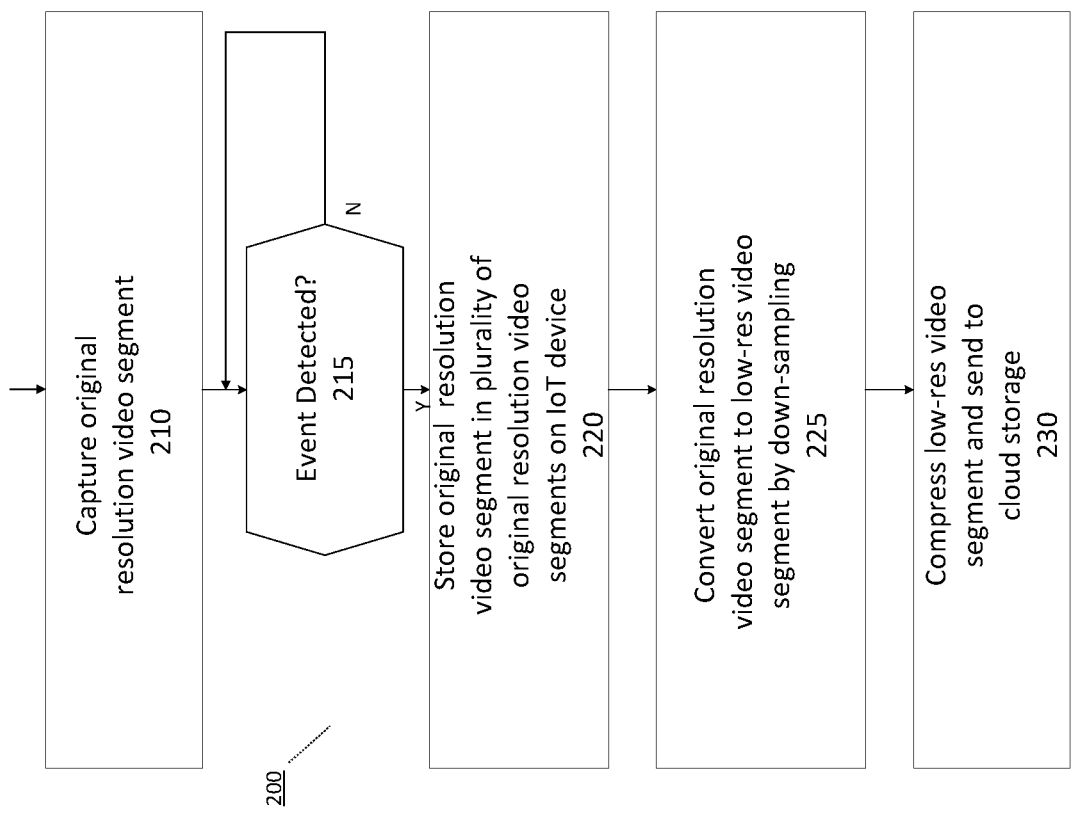

In embodiment of Cloud Backend

In embodiment of Cloud Backend

In embodiment of IoT device

Video Restoration Model Architecture

OPTIMIZING VIDEO DATA UPLOAD FOR DASHCAM EVENT REVIEWS

TECHNICAL FIELD

One or more embodiments relate to the field of Internet of Things (IoT) systems, and more specifically, to optimizing video data upload over a network from a dashcam to a storage destination.

BACKGROUND ART

Vehicles are often equipped with dash cameras (dashcams) to capture video of the surroundings and/or interior of the vehicle. Many current generation dashcams have the ability to detect safety events such as distracted driving or unsafe driving using machine learning models that run on the dashcams (aka edge devices). For every unsafe event that the dashcam detects, a short evidence video is uploaded to the cloud to enable reviews and coaching. A human observer then verifies these videos and takes appropriate action.

A similar review system may review video segments for a different purpose. For example, a reviewer may review videos of camera footage to review video of accident or videos of home break-ins.

The short evidence videos are uploaded from the dashcam using mobile networks like LTE or 5G, which adds to significant operational costs. To optimize the cost, one standard solution is to reduce video resolutions or reduce bitrates of the uploaded videos which results in suboptimal viewing quality for human reviewers.

BRIEF DESCRIPTION OF THE DRAWINGS

The following figures use like reference numbers to refer to like elements. Although the following figures depict various exemplary embodiments, alternative embodiments are within the spirit and scope of the appended claims. In the drawings:

FIG. 2A illustrates a flow diagram of exemplary operations that can be performed by the IoT device for uploading video to the cloud, in accordance with some embodiments.

DETAILED DESCRIPTION

The following description describes methods and apparatus for optimizing video data upload from an IoT device to a cloud data storage for later review. IoT devices are deployed and used to support a variety of applications and use cases. In non-limiting examples, the IoT devices can be used in fleet management applications, asset tracking applications, industrial applications (manufacturing analytics, process monitoring, condition monitoring), and remote monitoring of environments (such as in factories, warehouses, etc.), etc.

Overview

Dual-lens dashcams continuously record videos of both a) an inward-facing view showing a driver and portions of a vehicle interior and b) the road and scenery in front of the vehicle. The video output of dashcams are widely used for the fleet management. For example, fleet managers use resulting high-definition videos from dashcams to launch coaching program based on driver's driving behavior, or as evidence in the event of a road accident. Video storage is expensive both in terms of the cellular network required to transmitted to cloud or raw video storage offline. The embodiments described here use edge AI to detect events of interest and a cloud video restoration model to optimize the video storage and data uploading.

In the described embodiments, a plurality of low resolution video segments captured by a dashcam, security camera, or similar device, are stored on a cloud storage device and upscaled to a "higher resolution" before they are reviewed by a reviewer. In this case, "higher resolution" means that the upscaled video segments are of a higher resolution than the low resolution video segments. As discussed below, the "higher resolution" video segments may or may not be of a higher resolution than the original resolution video segments captured by the dashcam.

Similarly, a plurality of original resolution video segments are stored on the IoT device and requested by a reviewer only when needed. It is anticipated that these original resolution video segments will be requested in special circumstances when it is not appropriate to review an upscaled video segment. In some embodiments, the original resolution video segments are stored on the IoT device for a limited period of time since the IoT device has a limited amount of storage onboard. In one embodiment, original resolution video segments are typically stored for several weeks or until the onboard storage is full.

Uploading Low Resolution Video Segments to the Cloud for Storage

Figure 1:
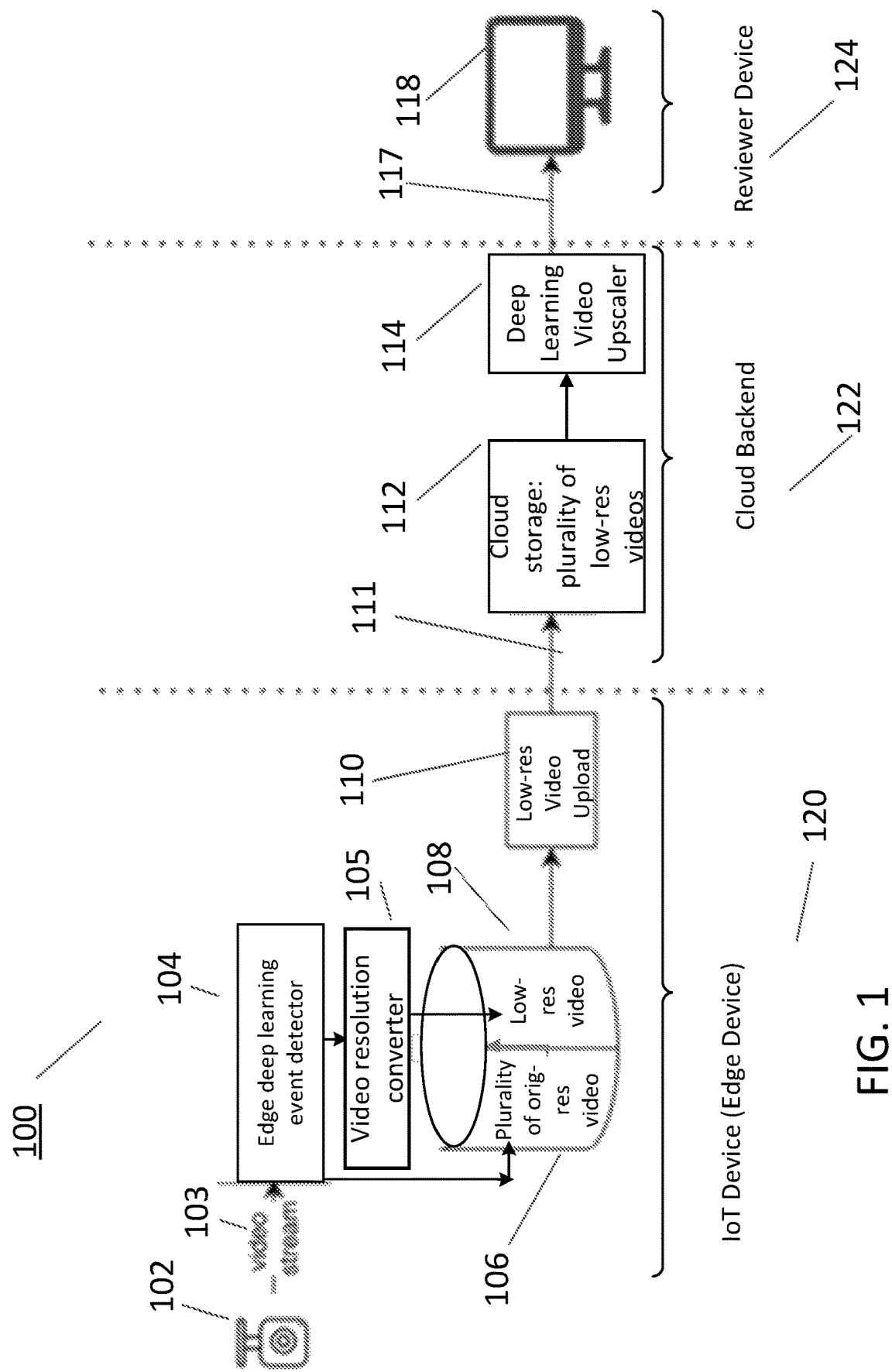
FIG. 1 is a block diagram illustrating a system for optimizing video data upload from an IoT device to a cloud data storage for later review, according to some example embodiments.

FIG. 1 is discussed below in connection with the flowcharts of FIGS. 2A and 2B.

FIG. 1 is a block diagram 100 illustrating a system for optimizing video data upload from a dashcam camera 102 captures at least one video stream 103.

FIG. 2A illustrates a flow diagram 200 of exemplary operations that can be performed by the IoT device for uploading video to the cloud, in accordance with some embodiments.

Figure 2B:
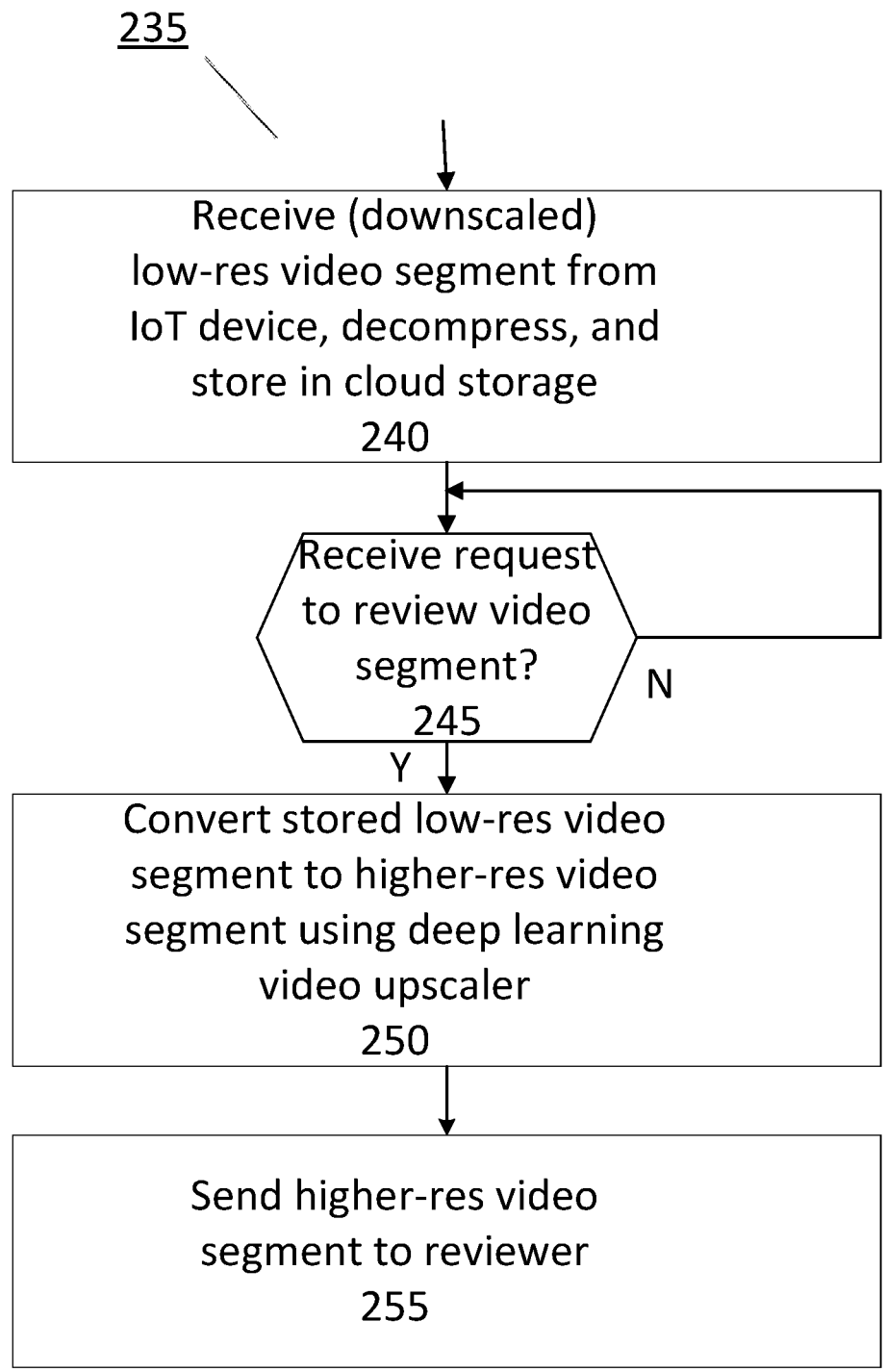
FIG. 2B illustrates a flow diagram of exemplary operations that can be performed by an a cloud backend for storing video for later review, in accordance with some embodiments.

FIG. 2B illustrates a flow diagram 235 of exemplary operations that can be performed by a cloud backend for storing video for later review, in accordance with some embodiments.

In FIG. 1, camera 102 captures original resolution video (flowchart element 210). As an example, video stream 103 may be formed of video from two points of view: a) a video output showing a view inside of a vehicle cab and b) a video output showing a view of a road from the vehicle point of view. In other examples, camera 102 may output only a single video stream or may output more than two video streams, such as an inward, outward, and side view from the vehicle. For purposes of this discussion, only one video stream 103 will be discussed, although it will be understood that the described methods, systems, and devices can also be used for a camera that produces video streams from two or more points of view.

In one embodiment, video stream 103 is input to an edge deep learning event detector 104 to detect a portion of the video stream corresponding to an event (flowchart element 215). An event is a situation or visual aspect of the video that makes it desirable to capture a portion of the video for future analysis or review. For example, an event may occur if the vehicle is exceeding the speed limit by a predetermined amount (for example, by 0 MPH, by 10 MPH, etc.). Another example of an event is a traffic accident involving the vehicle being in an accident, failing to stop at a stop sign, etc. Another example is that video is stored when an event occurs that is categorized as driver inattention, such as but not limited to failure to notify traffic changes, failure to stop for stop signs, etc. Another example is that video is stored when an event occurs that indicates that the driver is using a mobile phone while driving, such as but not limited to the driver looking downward while driving, or the driver swerving while driving, etc. Videos are typically stored to aid in coaching the driver to avoid dangerous behaviors such as inattention or using a mobile phone while driving. In some embodiments, the edge deep learning event detector 104 is implemented as a multi-task deep learning model, which uses light-weight convolutional neural layers as the feature extraction from the outward/inward views from camera 102, concatenated with separate classification heads for mobile phone usage/food usage/beverage usage, distraction, drowsiness, crash with other cars etc. Detector 104 receives video stream 103 and indicates whether an event is detected.

In some embodiments, video is stored only for video segments pertaining to detected events, while omitting storage of all other videos. The videos segments are saved both in original resolution 106 and in low resolution 108. In one embodiment, for different types of events, the video length is different, the video length generally being long enough to show the event. In some embodiments, all or a plurality of original resolution videos corresponding to events are saved in a memory of IoT device 120 (flowchart element 220). Low resolution videos corresponding to events are created by use of a video resolution converter 105 (flowchart element 225) and are sent to cloud storage 112 in a cloud backend 122 (flowchart element 230).

Communication 111 between the IoT device 120 and cloud backend 122 can be accomplished using any appropriate method, such as, for example, wireless communication and the Internet. Low resolution video upload module 110 effects this communication. Storing only video associated with events saves bandwidth cost because not all captured videos are saved to the cloud. Similarly, storing low resolution video saves bandwidth cost because fewer bits need to be sent between the IoT device and the cloud backend. Uploading low resolution video uploading significantly reduces the LTE bandwidth and cloud storage requirements over systems that upload all videos and/or that upload video at an original resolution.

The amount that the resolution of the original resolution video is reduced varies in varying embodiments. For example, resolution of an original resolution video segment may be reduced by ⅙th of the original video resolution, by ⅛ of the original video resolution, or by somewhere in between. For example, in a Full HD (FHD) camera where the original resolution video segment has frames with a resolution of 1920×1080 pixels, a low resolution video segment for an event may have a resolution of 320×180 pixels. In this example, reducing the resolution of the video segment linearly reduces a bitrate from typical ~2.5 Mbps (bits per second) down to ~400 Kbps, thus significantly reducing the LTE bandwidth and cloud storage requirements. Other percentages of reduction of resolution may be used in other embodiments without departing from the spirit of the invention. Factors affecting the change in resolution include, for example, without limitation, the actual resolution captured by the dashcam, the speed of the method available for uploading video to the cloud, the resolution of video acceptable to the reviewer, and the resolution of the display available to the reviewer.

As each original resolution video segment is captured, identified as relating to an event, and reduced in resolution, the newly produced low resolution video segment is transmitted to the cloud backend where it is stored with a plurality of previously transmitted low resolution video segments in cloud storage 112 (flowchart element 240).

It will be understood by persons of ordinary skill in the art that in some embodiments, video segments sent over a network 111 between IoT device 120 and cloud backend 122 are also compressed using a video codec in a manner know to persons of ordinary skill in the art. This compression is in addition to any downscaling performed before the videos are compressed and transmitted. Any appropriate video codec can be used for this purpose. In some embodiments, parameters of the video codecs are adjusted so that the video segment can be compressed less after the video segment has been downscaled, thus still resulting in reduced bandwidth.

In the described embodiment, audio files from camera 102 are also compressed using an appropriate audio codec. In the embodiment(s) of FIGS. 1-5, the audio files are not further modified, in contrast to the video files, which may also be downscaled prior to sending to cloud backend 122 as described herein.

A reviewer (such as a human reviewer) reviews video from one or more IoT devices on a reviewer device 124 using a display 118. In one embodiment, the reviewer system communicates with the cloud backend through a network, such as the Internet or other appropriate network. In one embodiment the reviewer system passes one or more requests from a reviewer/user for a particular video to the cloud backend, and the cloud backend system then sends the requested video to the reviewer system using an appropriate method known to persons of ordinary skill in the art for sending video over a network. Although a human reviewer is discussed here, it should be understood that in some embodiments, this reviewer may not be a human being, but may be a software reviewer. When a human reviewer is ready to review a new video segment, reviewer device 124 requests a new video for review from cloud backend 122. When cloud backend 122 receives a request from reviewer device 124 (flowchart element 245), it retrieves the requested video segment from cloud storage 112 and uses deep learning video upscaler 114 to upscale the resolution of the video (Flowchart element 250), which is then sent 117 to the reviewing display 118 on reviewer device 124 (flowchart element 255).

In some embodiments, low resolution videos are selectively upscaled before they are requested and are then cached until a request is received. This would occur, for example, if the cloud backend determines that the particular video segments most-likely will be requested in the near future.

In some embodiments, a reviewer takes an action after reviewing one or more video segments. For example, a reviewer may use a user interface on reviewer device 118 to mark a vehicle driver as needing counseling or warning about their driving behavior.

In the above example, deep learning video upscaler 114 retrieves a low resolution video segment (320×180 @400 kpbs) and then uses deep learning to upscale the video segment back to original FHD resolution. The FHD resolution video is then sent to reviewer device 124 where it is presented to the event reviewer for review. In this example, saving the video segment at a low resolution and upscaling it before presenting it for review significantly improves the efficiency of human reviewers and at the same time requires ⅙th the bandwidth and cloud storage. Upscaling a video before it is viewed by a human viewer reduces cognitive load of the human reviewer in comparison to the cognitive load required of the human reviewer to review a low resolution video.

Figure 3:
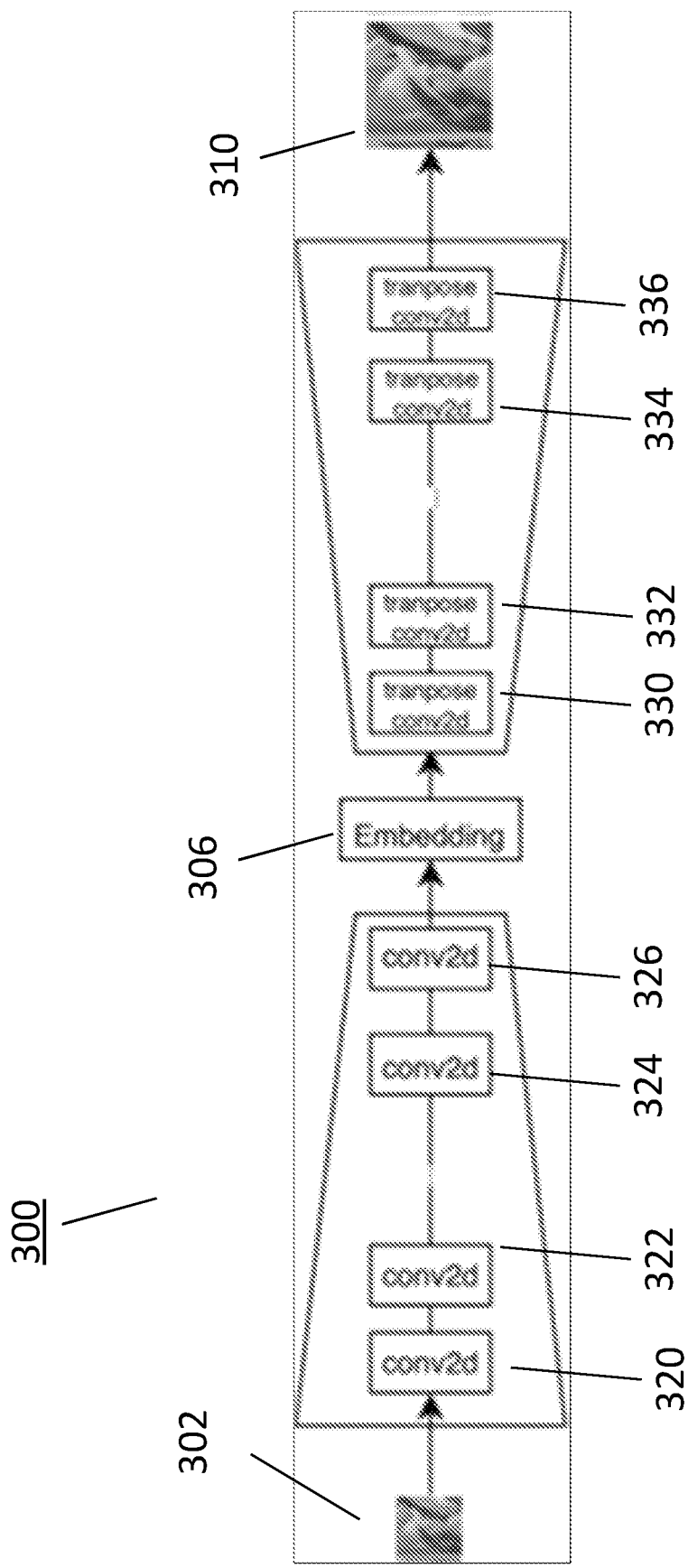
FIG. 3 illustrates a block diagram of a video restoration model architecture, in accordance with some embodiments.

FIG. 3 illustrates a block diagram 300 of a video restoration model architecture used in deep learning video upscaler 114, in accordance with some embodiments. The model inputs each frame of a low resolution video 302 and uses deep Convolutional Neural Networks (CNN) as feature extraction with multiple layers of residual modules (320-326), to yield an embedding 306, following by the image construction component with conv2d transpose module (330-336). The output of the model is the high resolution restoration 310 of the input. The embodiment of FIG. 3 uses a loss function of L1, which is the pixel loss of the reconstructed high resolution image and the original high resolution image (also called a ground truth image), although other loss functions could be used as appropriate. It will be understood that other embodiments may use different methods of upscaling the received low resolution video. Some example methods of upscaling are discussed in "Video Super Resolution Techniques: A Survey," Nogueira et al, International Journal of Engineering research & Technology (IJERT), Vol. 10, Issue 07, July 2021, which is herein incorporated by reference.

In general, the higher resolution video output from deep learning video upscaler 114 will not be exactly identical to the original resolution video captured by camera 102 of the IoT device. In the current embodiment, certain details may be less sharp, for example. Whether the higher resolution video output by upscaler 114 has a resolution that is less than, the same as, or higher than the original captured video will depend on the upscaling method used in deep learning video upscaler 114. For example, different upscaling methods may use different loss functions.

The model of deep learning video upscaler 114 is trained using pairs of high resolution video frames and low resolution video frames. The model is trained until it can output an acceptable high resolution frame from an input of a low resolution frame.

Uploading Original Resolution Video Segments for Review

FIG. 1 is further discussed below in connection with the flowcharts of FIGS. 2C and 2D.

Figure 2C:
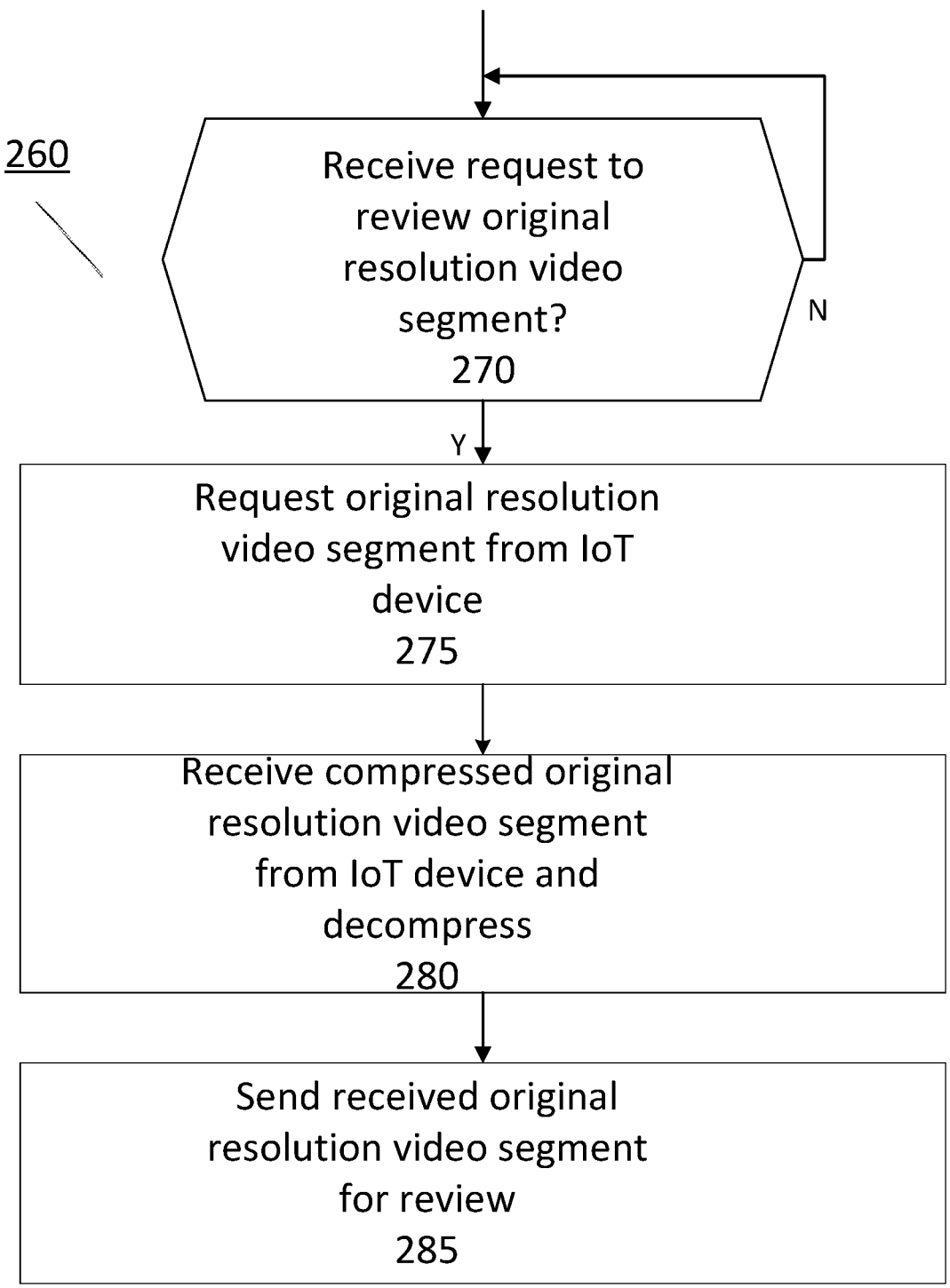
FIG. 2C illustrates a flow diagram of exemplary operations that can be performed by the cloud backend to obtain video from the IoT device in an original resolution for storing video for later review, in accordance with some embodiments.

FIG. 2C illustrates a flow diagram 260 of exemplary operations that can be performed by the cloud backend to obtain video from the IoT device in an original resolution for storing video for later review, in accordance with some embodiments.

Figure 2D:
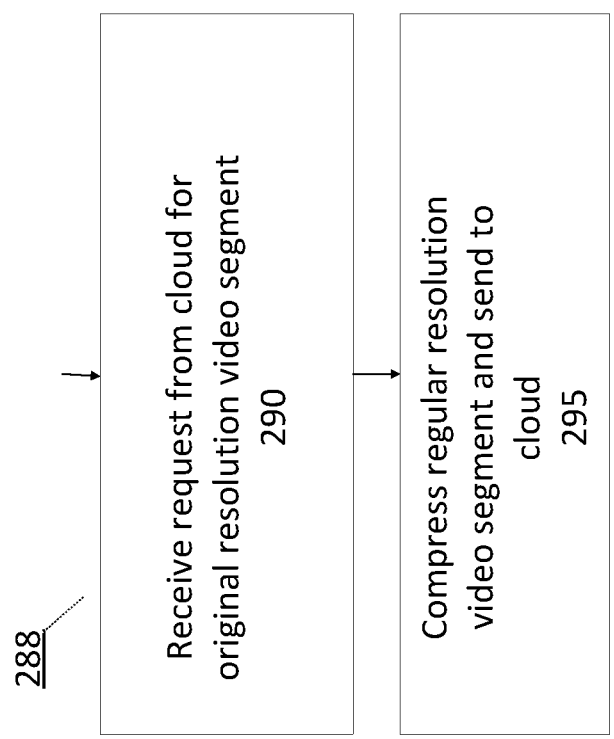
FIG. 2D illustrates a flow diagram of exemplary operations that can be performed by the IoT device for uploading an original resolution video to the cloud, in accordance with some embodiments.

FIG. 2D illustrates a flow diagram 288 of exemplary operations that can be performed by the IoT device for uploading an original resolution video to the cloud in response to a request for review, in accordance with some embodiments.

As discussed above, camera 102 captures video segments in an original resolution. These original resolution video segments are stored in a plurality of original resolution video segments 106 on the IoT device. Sometimes, a reviewer has a need to review an original resolution video. Certain types of review require an original resolution video that has not been upscaled or downscaled (e.g., legal review). Similarly, sometimes a reviewer may have reviewed an upscaled video but has a wish to further review an original resolution video that corresponds to the upscaled video. In such situations, cloud backend 122 may receive a request from the reviewer device 124 for an original resolution video (flowchart element 270). In some embodiments, this request may be relayed to IoT device 120 through the cloud backed 122 as shown in the flowchart of FIG. 2C (element 275). In other embodiments, the request may be sent directly to IoT device 120.

As shown in FIG. 2C, IoT device 120 receives the request and sends 111 the requested original resolution video segment to cloud backend 122 (flowchart element 280). In the embodiment of FIGS. 2C and 2D, the IoT device receives a request for an original resolution video that is stored in the plurality of original resolution videos 106 (flowchart element 290). The requested original resolution video segment is sent to cloud backend 122 (Flowchart element 295). Cloud backend 122 sends the original resolution video segment to reviewer device for review on reviewer device 118 (flowchart elements 285). It will be understood that in other embodiments, reviewer device 124 requests an original resolution video segment directly from the IoT device without involving cloud backend 122.

Note, that it may be necessary for the reviewer to request the original resolution video from the IoT device if they wish to review a non-enhanced version of the video. For certain purposes, an original, non-enhanced version of the video segment is desirable. The example discussed here allows enhanced and/or upscaled videos to be viewed initially without having to request, receive and store videos having the original resolution captured by the IoT device.

It should be noted that in one embodiment, a first reviewer who reviews upscaled, higher resolution video segments is a different entity from the reviewer who reviews original resolution video segments requested from the IoT device. In such as system, the first reviewer might be reviewing video for counseling an draining, as discussed above while the second reviewer might be reviewing videos resulting from accidents. The first and the second reviewer have different needs for the type of video they are reviewing the first reviewer may review many videos in a day and the resolution of the video, while important, is not their priority. In one embodiment, the reviewer can identify an area of interest and request that the area of interest be upscaled (or further upscaled). In contrast, the second reviewer may be required to review video segments that have not been upscaled or downscaled.

In another embodiment, the first reviewer and the second reviewer are the same entity. For example, a first reviewer may need to review details of a particular video segment that were lost during the downscale/upscale process. In such a case, the reviewer can request the original resolution video segment occasionally and see the video segment as it was captured by the camera.

Upscaling an Area of Interest for Review

Figure 4A:
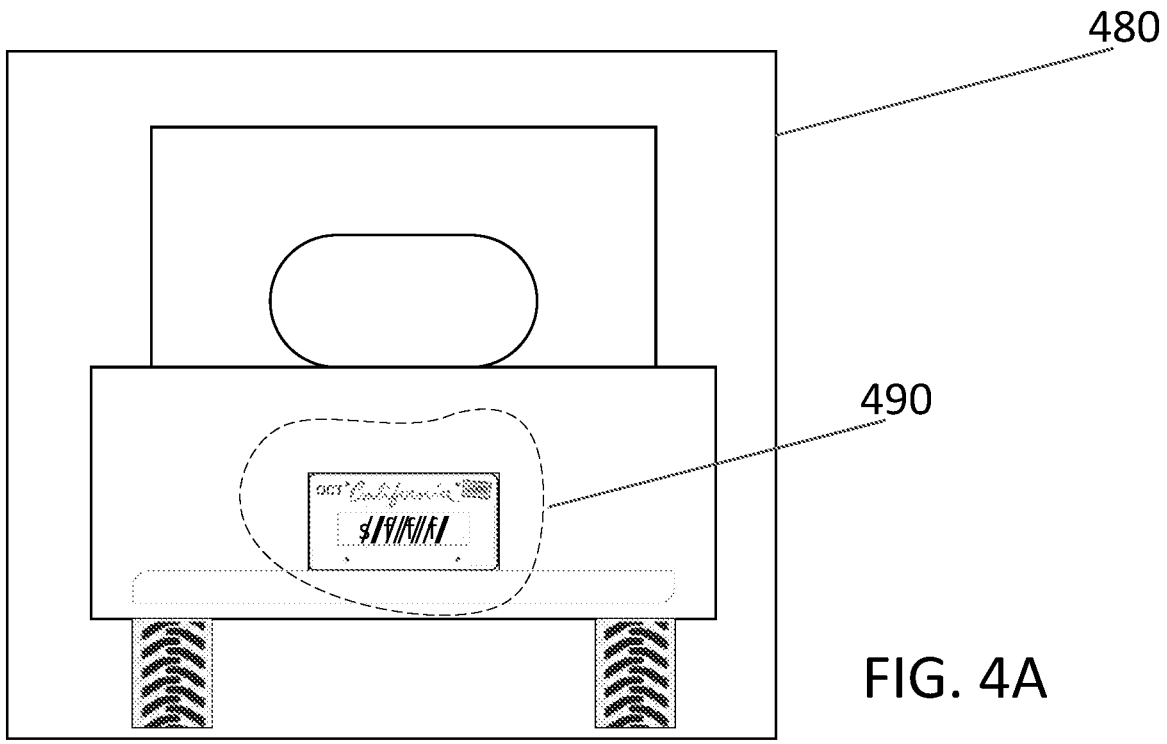
FIG. 4A shows an example of a video frame having an area of interest
Figure 4B:
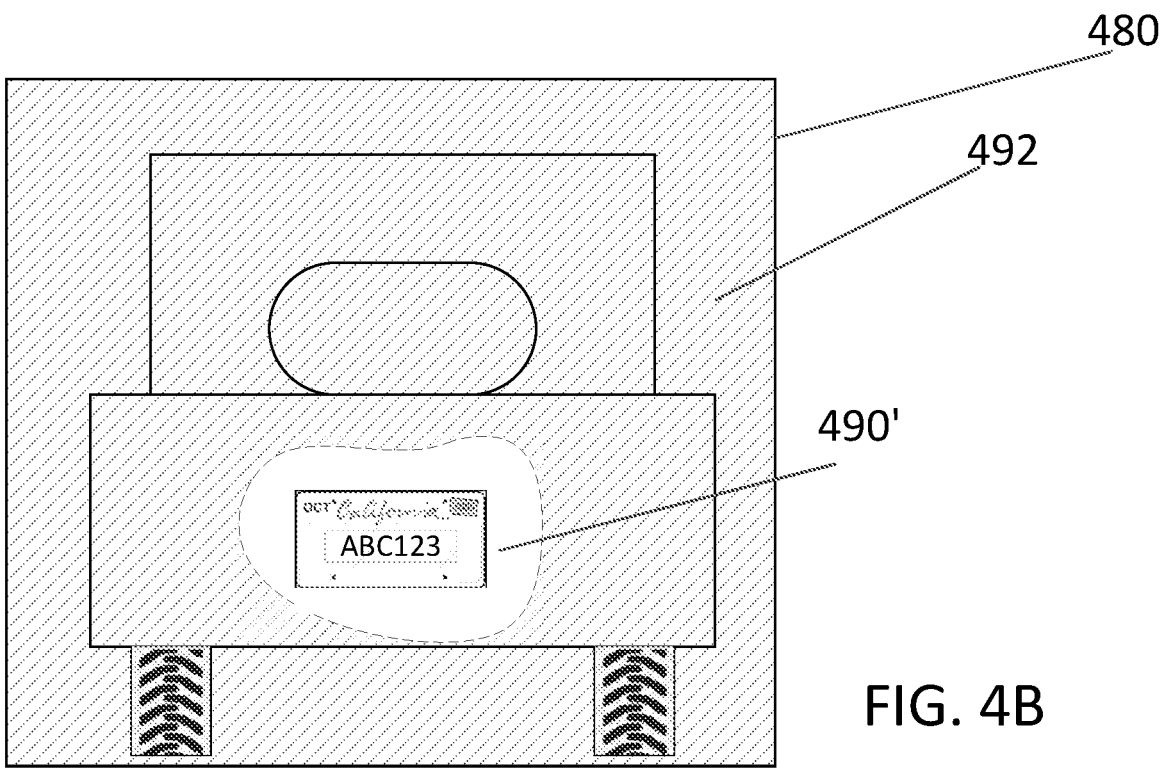
FIG. 4B shows an example of the video frame of FIG. 4A in which the resolution of the area of interest is not degraded.

FIGS. 4A and 4B relate to an embodiment of the invention where video in cloud backend 122 are not automatically upscaled before reviewing. Such an embodiment might be used in a scenario where a reviewer is reviewing low resolution videos for coaching purposes. For example, a reviewer might be looking for example of driving errors so that the driver can be coached about the errors. This type of review may not require the video to automatically be upscaled.

FIG. 4A shows an example of a video or a video frame 480 having an area of interest 490 as identified by a reviewer on a display screen. In this example, a reviewer has viewed a low resolution video stored in cloud backend 122 but cannot clearly see the license plate in the area of interest. The reviewer indicates via a UI that they wish to see the area of interest 490 in a higher resolution. The reviewer device sends a request to cloud backend 122 to upscale only the area of interest 490. Cloud backend 122 upscales only the identified area of interest 490 using any appropriate known method, as described above, and sends a new version of the video or video frame as shown in FIG. 4B.

FIG. 4B shows an example of the video frame 480 of FIG. 4A in which the resolution of the area of interest 490' has been upscaled so that the area of interest has a higher resolution, and displayed to the reviewer. In this example, the non-area of interest 492 has been grayed out on the review display to facilitate review of the area of interest 490', although this may not occur in all embodiments.

Exemplary Environment

Exemplary Electronic Devices

One or more parts of the above embodiments may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off, or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long-term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals-such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to other electronic device(s) (sometimes referred to as a client electronic device, a client computing device, or a client device) that executes client software (sometimes referred to as client code or an end-user client) to communicate with the service. The server and client electronic devices may be operated by users respectively in the roles of administrator (also known as an administrative user) and end-user.

Alternative embodiments of an electronic device may have numerous variations from that described above. For example, customized hardware and/or accelerators might also be used in an electronic device.

Figure 5A:
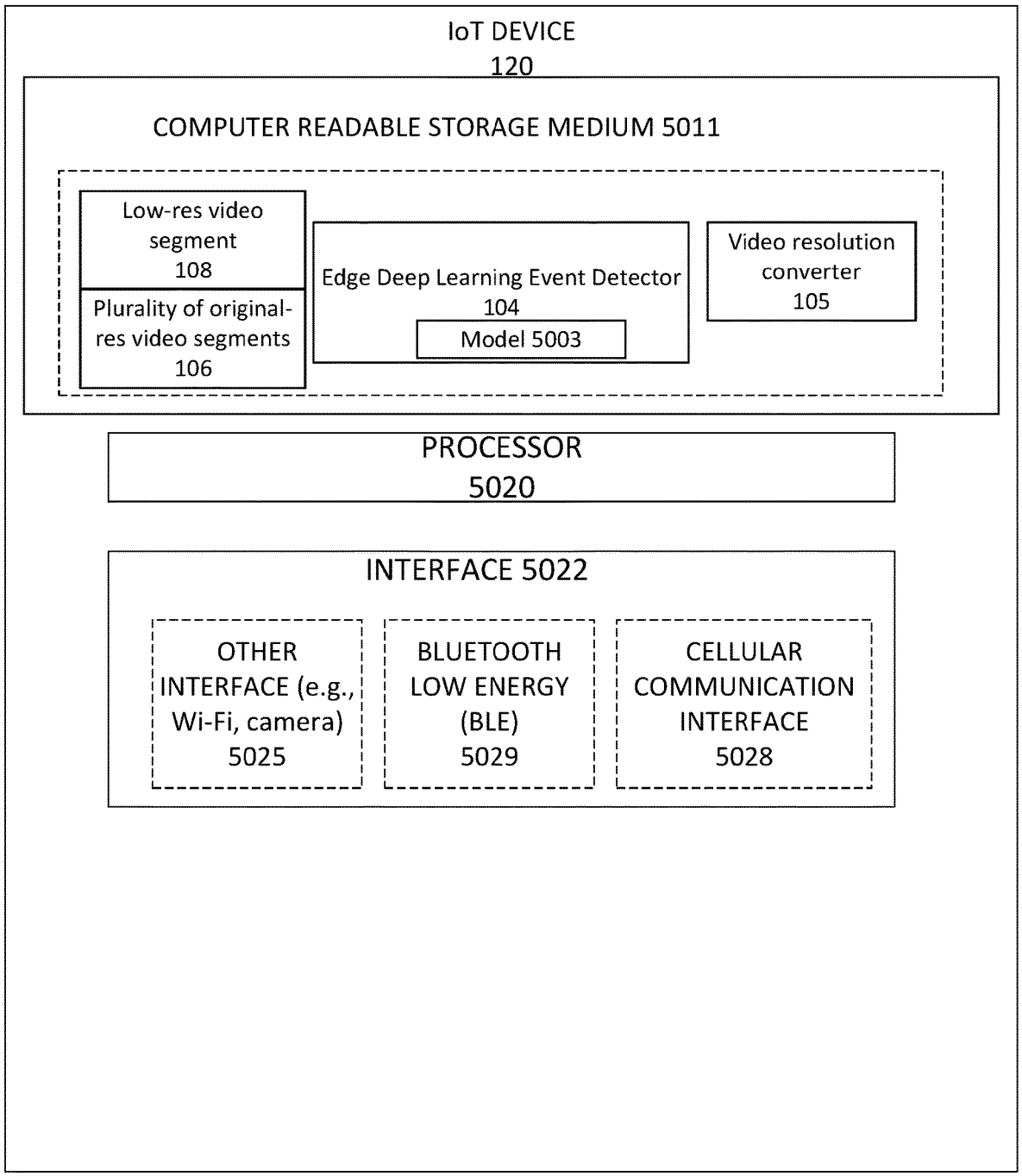
FIG. 5A illustrates a block diagram of an exemplary IoT device that can be used in some embodiments.

FIG. 5A illustrates a block diagram of an exemplary IoT device 120 that can be used in some embodiments. According to one embodiment, IoT device 120 is implemented on an electronic device which includes hardware and software. This hardware includes network communication interfaces 5022 coupled with one or more processor(s) 5020, and a computer-readable storage medium 5011. Computer-readable storage medium 5011 includes a plurality of original resolution videos 106 and at least one low-resolution video 108. The computer-readable storage medium 5011 includes an edge deep learning event detector 104, which includes a trained machine learning model 5003. Edge deep learning event detector 104, when executed by the processor(s) 5020, causes the IoT device to detect "events" occurring in original resolution video received from the camera 102 of FIG. 1. When an event is detected in the video, the original resolution video is stored as one of the videos I original low-res video 106. In addition, the computer-readable storage medium 5011 includes a video resolution converter 105 that converts a video of original resolution that contains the event to a video of a low resolution as discussed above in connection with FIG. 2A. The video of low resolution is temporarily stored in low-res video 108 until it is sent to the cloud backend 122 for storage.

The IoT device 120 also includes one or more communication interfaces 5022, which are provided to allow a user to provide input to, receive output from, and otherwise transfer data to and from the IoT device 120. Exemplary Input/Output devices and interfaces include wired and wireless transceivers, such as a Bluetooth Low Energy (LE) transceiver 5029, an IEEE 802.11 transceiver (Wifi) 5025, an infrared transceiver, a wireless cellular communication interface (e.g., 2G, 3G, 4G, 5G, etc.) 5028, a diagnostic port, or another wireless protocol 5025 to connect the IoT device 120 with another device, external component, or a network, and receive stored instructions, data, tokens, etc. It will be appreciated that one or more buses may be used to interconnect the various components shown in FIG. 5A.

It will be appreciated that additional components, not shown, may also be part of the IoT device 120, and, in certain embodiments, fewer components than that shown in FIG. 5A, may also be used in an IoT device 120. In some embodiments, the IoT device 120 may act as a gateway system or alternatively as a wireless sensing device.

While some components of the IoT device 120 are illustrated as code stored on the computer-readable storage medium, in other embodiments the modules may be implemented in hardware or in a combination of hardware and software.

Figure 5B:
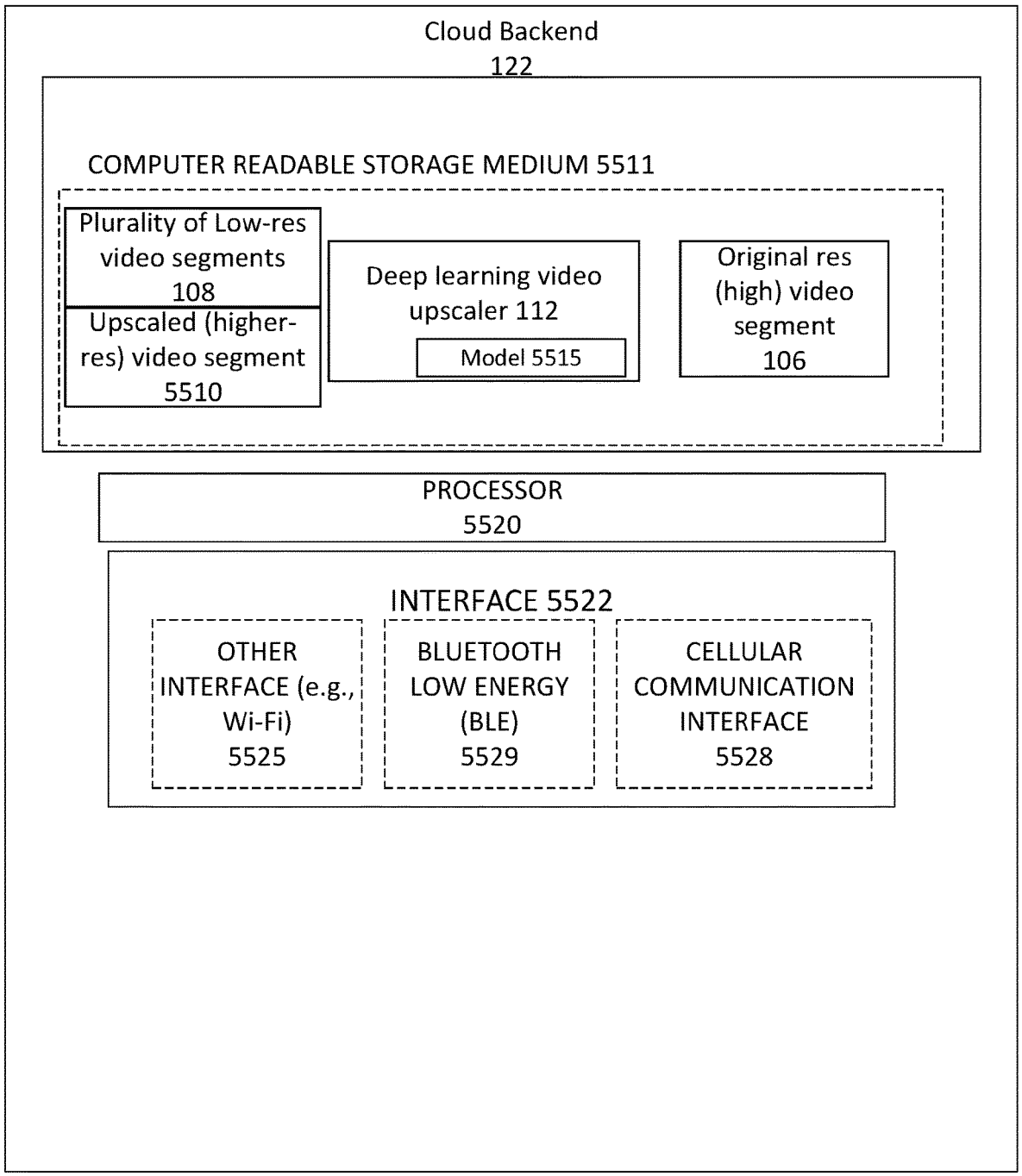
FIG. 5B illustrates a block diagram of an exemplary cloud server that can be used in some embodiments.

FIG. 5B illustrates a block diagram of an exemplary cloud backend 122 that can be used in some embodiments. According to one embodiment, cloud backend 122 is implemented on an electronic device which includes hardware and software. Hardware includes network communication interfaces coupled with one or more processor(s) 5520, and a computer-readable storage medium 5522. The computer-readable storage medium 5511 includes a plurality of low-resolution videos 108 received from IoT device 120, an upscaled video 5510, which is temporarily stored before being sent to reviewer 118. The computer readable storage medium can also store an original resolution video 106 received from the IoT device 106 and stored temporarily before seeing sent to a second reviewer. As discussed above, the plurality of low resolution videos are stored on the cloud backend 122 and upscaled before review, while the original resolution videos are stored on the IoT device and transmitted to a reviewer only when requested.

The computer-readable storage medium 5511 includes deep learning video upscaler 112, which includes a trained machine learning model 5515. Deep learning video upscaler 112, when executed by the processor(s) 5520, causes the cloud backend to upscale one or more videos from low-res video storage 108 on the cloud backend to produce upscaled video 5510, which is sent to a reviewer. In addition, the computer-readable storage medium 5511 includes an original resolution video 106, which has been requested by the reviewer and which is temporarily stored before being sent to the reviewer for review.

The cloud backend 122 also includes one or more communication interfaces 5522, which are provided to allow a user to provide input to, receive output from, and otherwise transfer data to and from the cloud backend 122. Exemplary Input/Output devices and interfaces include wired and wireless transceivers, such as a Bluetooth Low Energy (LE) transceiver 5529, an IEEE 802.11 transceiver (Wifi) 5525, an infrared transceiver, a wireless cellular communication interface (e.g., 2G, 3G, 4G, 5G, etc.) 5028, a diagnostic port, or another wireless protocol 5525 to connect the cloud backend 122 with another device, external component, or a network, and receive stored instructions, data, tokens, etc. It will be appreciated that one or more buses may be used to interconnect the various components shown in FIG. 5B.

It will be appreciated that additional components, not shown, may also be part of the cloud backend 122, and, in certain embodiments, fewer components than that shown in FIG. 5B, may also be used in cloud backend 122. In some embodiments, the cloud backend 122 may act as a gateway system or alternatively as a wireless sensing device.

While some components of the cloud backend 122 are illustrated as code stored on the computer-readable storage medium, in other embodiments the modules may be implemented in hardware or in a combination of hardware and software.

CONCLUSION

In the above description, numerous specific details such as resource partitioning/sharing/duplication embodiments, types and interrelationships of system components, and logic partitioning/integration choices are set forth in order to provide a more thorough understanding. It will be appreciated, however, by one skilled in the art, that the invention may be practiced without such specific details. In other instances, control structures, logic embodiments, opcodes, means to specify operands, and full software instruction sequences have not been shown in detail since those of ordinary skill in the art, with the included descriptions, will be able to implement what is described without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations and/or structures that add additional features to some embodiments. However, such notation should not be taken to mean that these are the only options or optional operations, and/or that blocks with solid borders are not optional in certain embodiments.

In the following description and claims, the term "coupled," along with its derivatives, may be used. "Coupled" is used to indicate that two or more elements, which may or may not be in direct physical or electrical contact with each other, co-operate or interact with each other.

The operations in the flow diagrams are be described with reference to the exemplary embodiments in the other figures. However, the operations of the flow diagrams can be performed by embodiments other than those discussed with reference to the other figures, and the embodiments discussed with reference to these other figures can perform operations different from those discussed with reference to the flow diagrams.

While the above description includes several exemplary embodiments, those skilled in the art will recognize that the invention is not limited to the embodiments described and can be practiced with modification and alteration within the spirit and scope of the appended claims. The description is thus illustrative instead of limiting.

What is claimed is:

1. A method, performed by an IoT device, comprising:
    capturing an original resolution video segment from a camera of the IoT device;
    detecting an event in the original resolution video segment;
    in response to the detecting the event:
        storing the original resolution video segment in a memory of the IoT device,
        converting the original resolution video segment to a low-resolution video segment by downscaling the original resolution video segment, and sending the low-resolution video segment to a cloud backend, where the cloud backend is capable of making the low-resolution video segment available to a first reviewer for review, where the first reviewer flags the low-resolution video segment for further review;

receiving a request from the cloud backend for the original resolution video segment, where a second reviewer sends the request in response to the flagging by the first reviewer; and sending the requested original resolution video segment to the cloud backend, where the cloud backend is capable of making the original resolution video segment available to the second reviewer for review.

2. The method of claim 1, further comprising:
compressing the low-resolution video segment by the IoT device using a video codec; and
wherein the sending further comprises: sending the compressed low-resolution video segment by the IoT device to the cloud backend.

3. The method of claim 1, wherein the detecting further comprises detecting an event using a deep learning event detector.

4. The method of claim 1, where the camera is one of a group including: a dashcam, a home security camera, a warehouse camera.

5. The method of claim 1, wherein the original resolution video segment is stored in a plurality of original resolution video segments stored on the IoT device.

6. The method of claim 1, wherein the camera produces front video segments and in-vehicle video segments.

7. The method of claim 1, where the event comprises at least one of mobile phone usage/food usage/beverage usage, distraction, drowsiness, crash with other cars.

8. The method of claim 1, where the first reviewer and the second reviewer are the same entity.

9. A non-transitory machine-readable storage medium that provides instructions that, if executed by a processor of a server located in a cloud will cause said processor to perform operations comprising:
receiving by a cloud backend from an IoT device, a low-resolution video segment that has been downscaled by the IoT device;
storing the low-resolution video segment in a cloud storage of the cloud backend;
receiving a request from a first reviewer to review the low-resolution video segment;
in response to receiving the request to review the low-resolution video segment:
converting the stored low-resolution video segment to a higher resolution video segment using a deep learning video upscaler, and
sending the higher resolution video segment to a first reviewer for review, where the first reviewer flags the low-resolution video segment for further review;
receiving a request from a second reviewer to review an original resolution video segment, where a second reviewer sends the request in response to the flagging by the first reviewer; and
in response to receiving the request to review an original resolution video segment:
obtaining the original resolution video segment from the IoT device, and
sending the original resolution video segment to the second reviewer for review.

10. The on-transitory machine-readable storage medium of claim 9, wherein the converting further comprises:
using a deep learning video segment upscaler to convert the stored low-resolution video segment to the higher resolution video segment in the cloud backend.

11. The non-transitory machine-readable storage medium of claim 9, wherein the converting comprises:
converting only an area of interest in the low-resolution video segment to a higher resolution, in response to a request from the reviewer, where the request identifies the area of interest.

12. The on-transitory machine-readable storage medium of claim 9, wherein the higher resolution video segment is of a lower resolution than the original resolution video segment.

13. The on-transitory machine-readable storage medium of claim 9, wherein the storing the low-resolution video segment comprises storing the low-resolution video segment in a plurality of low-resolution video segments stored in a memory of the cloud backend.

14. The on-transitory machine-readable storage medium of claim 9, where the first reviewer and the second reviewer are the same entity.

15. The on-transitory machine-readable storage medium of claim 9, wherein the first reviewer is reviewing video segments in a review and coaching system for fleet drivers.

16. The on-transitory machine-readable storage medium of claim 9, wherein the second reviewer is reviewing video segments in an accident review system.

17. A system comprising:
one or more first processors;
one or more second processors;
a first non-transitory machine-readable storage medium in an IoT device that stores instructions, which when executed by the one or more first processors cause the system to perform operations including:
capturing an original resolution video segment by the IoT device,
detecting an event in the original resolution video segment, and
in response to the detecting the event:
storing the original resolution video segment in a memory of the IoT device, the memory containing a plurality of original resolution video segments, and
converting the original resolution video segment to a low-resolution video segment by downscaling the original resolution video segment; and
a second non-transitory machine-readable storage medium in a cloud backend that stores instructions, which when executed by the one or more second processors cause the system to perform operations including:
obtaining the low-resolution video segment from the IoT device by the cloud backend;
storing the low-resolution video segment in a cloud storage of the cloud backend,
in response to receiving a request by the cloud backend to review the low-resolution video segment:
converting, by the cloud backend, the stored low-resolution video segment to a higher resolution video segment, and
sending, by the cloud backend, the higher resolution video segment to a reviewer for review, and
in response to receiving a request from the reviewer to the cloud backend to review the original resolution video segment:
obtaining, by the cloud backend, the original resolution video segment from the IoT device, and sending, by the cloud backend, the original resolution video segment to the reviewer for review.

18. The system of claim 17, further comprising, performed by the one or more first processors:
compressing the low-resolution video segment by the IoT device using a video codec; and
sending the compressed low-resolution video segment by the IoT device to the cloud backend.

19. The system of claim 18, further comprising, performed by the one or more second processors:
decompressing the compressed low-resolution video segment using a video codec after the low-resolution video segment is sent to the cloud backend.

20. The system of claim 17, wherein the converting further comprises:
using a deep learning video segment upscaler to convert the stored low-resolution video segment to the higher resolution video segment in the cloud backend.

* * * * *

UNITED STATES PATENT AND TRADEMARK OFFICE
CERTIFICATE OF CORRECTION

| | | |
|---|---|---|
| PATENT NO. | : 12,335,518 B1 | Page 1 of 1 |
| APPLICATION NO. | : 18/064224 | |
| DATED | : June 17, 2025 | |
| INVENTOR(S) | : Jing Wang et al. | |

It is certified that error appears in the above-identified patent and that said Letters Patent is hereby corrected as shown below:

On the Title Page

Inventors item (72), Line 3, delete "John"

Signed and Sealed this
Twenty-eighth Day of October, 2025

John A. Squires
*Director of the United States Patent and Trademark Office*